United States Patent [19]

Kawamura et al.

[11] 4,102,853
[45] Jul. 25, 1978

[54] FIRE-RETARDANT THERMOPLASTIC POLYESTER RESIN COMPOSITIONS AND METHOD FOR IMPARTING FIRE RETARDANCY TO POLYESTER RESINS

[75] Inventors: Takeo Kawamura; Noritsugu Saiki; Yoshitugu Nakamura; Michiyuki Tokashiki, all of Iwakuni, Japan

[73] Assignee: Teijin Limited, Osaka, Japan

[21] Appl. No.: 622,498

[22] Filed: Oct. 15, 1975

[30] Foreign Application Priority Data

Oct. 17, 1974 [JP] Japan .................... 49-118706

[51] Int. Cl.$^2$ .................... C08K 3/22; C08K 3/26; C08K 5/03; C08K 3/40
[52] U.S. Cl. .................... 260/40 R; 260/45.7 P; 260/45.7 R; 260/45.75 B; 260/45.95 R; 260/45.95 G
[58] Field of Search .................... 260/45.7 P, 45.7 R

[56] References Cited

U.S. PATENT DOCUMENTS

| | | | |
|---|---|---|---|
| 3,403,036 | 9/1968 | Hindersinn et al. | 260/45.75 B |
| 3,516,957 | 6/1970 | Gray, Jr. et al. | 260/22 |
| 3,624,024 | 11/1971 | Caldwell et al. | 260/40 |
| 3,663,502 | 5/1972 | Murray et al. | 260/41 |
| 3,671,487 | 6/1972 | Abolins | 260/873 |
| 3,688,001 | 8/1972 | Exner et al. | 260/463 |
| 3,751,396 | 8/1973 | Gall | 260/40 |
| 3,847,861 | 11/1974 | Largman et al. | 260/40 |
| 3,852,394 | 12/1974 | Kubota et al. | 260/873 |
| 3,855,277 | 12/1974 | Fox | 260/45.7 R |
| 3,867,336 | 2/1975 | Fox | 260/45.7 |
| 3,875,108 | 4/1975 | Koch et al. | 260/45.7 P |
| 3,900,444 | 8/1975 | Racky et al. | 260/45.7 |
| 3,909,485 | 9/1975 | Hongo et al. | 260/45.75 B |
| 3,923,728 | 12/1975 | Seydl | 260/45.8 A |
| 3,947,421 | 3/1976 | Seydl | 260/40 |
| 3,966,677 | 6/1976 | Sonoyama et al. | 260/45.85 T |
| 4,010,219 | 3/1977 | Aoyama et al. | 260/45.8 A |
| 4,048,135 | 9/1977 | Wurmb et al. | 260/45.7 RL |

*Primary Examiner*—Melvyn I. Marquis
*Assistant Examiner*—R. A. White
*Attorney, Agent, or Firm*—Sherman & Shalloway

[57] ABSTRACT

A fire-retardant thermoplastic polyester resin composition free from "dripping" comprising
(A) 100 parts by weight of an aromatic polyester resin,
(B) from 0.5 to 100 parts by weight of an alkaline earth metal carbonate, and
(C) from 0.5 to 50 parts by weight of a fire retardant.

14 Claims, No Drawings

FIRE-RETARDANT THERMOPLASTIC POLYESTER RESIN COMPOSITIONS AND METHOD FOR IMPARTING FIRE RETARDANCY TO POLYESTER RESINS

This invention relates to a fire-retardant thermoplastic polyester resin composition and a method for rendering polyesters fire-retardant. The composition has markedly improved fire retardancy and is free from "drip" or "dripping" which refers to the phenomenon whereby a molded article of the composition becomes softened by flame and falls in the form of drops.

Thermoplastic aromatic polyester resins are used as a molding material in a variety of fields utilizing their useful properties such as superior chemical resistance or abrasion resistance, but suffer from the disadvantage that their utility is greatly restricted because of their property of burning comparatively easily and of undergoing dripping at the time of burning. With very thin molded articles, the disadvantageous drip phenomenon becomes more noticeable. Since the drip phenomenon may lead to the burning of a combustible body upon the falling of drops of the resin melt onto it, any attempt to impart satisfactory fire retardancy should desirably include measures against the "drip" phenomenon.

Many suggestions have previously been made in an attempt to impart fire retardancy to thermoplastic aromatic polyester resins. But none have been able to render the resins fire retardant and at the same time free from the drip phenomenon without essentially sacrificing their desirable properties. For example, even if a fire retardant is incorporated in polyester resins in an attempt to impart fire retardancy and freedom from dripping, no satisfactory result can be obtained, as will be demonstrated later in Comparative Examples. The use of too much fire retardant would naturally result in the substantial sacrificing of the desirable properties of the resins. The amount of the fire retardant that can be incorporated in the resin is therefore restricted.

Some attempts have also been made to avoid the undesirable drip phenomenon which occurs in thermoplastic aromatic polyester resins more notably than in other thermoplastic resins. They include, for example, the blending of a polytetrafluoroethylene resin (see Japanese Laid-Open Patent Publication No. 42942/72), the blending of fumed colloidal silica (see Japanese Laid-Open Patent Publication No. 32949/73), and the blending of asbestos (see Japanese Laid-Open Patent Publication No. 11281/72). Since, however, these additives have poor affinity for the polyester resins, the addition of them in amounts useful for preventing the drip phenomenon would unavoidably result in the deterioration of the properties of the polyester resins such as their tensile strength or bending strength.

Extensive investigations of the present inventors have led to the discovery that thermoplastic aromatic polyester resins can be rendered fire-retardant and free from dripping without sacrificing their useful properties by blending them with both a fire retardant and a specific alkaline earth metal carbonate. It has also been found that glass fibers generally considered to aggravate the drip phenomenon (see, for example, U.S. Pat. No. 3,751,396), when incorporated in a thermoplastic aromatic polyester resin together with the fire retardant and the alkaline earth metal carbonate, can produce a reinforcing effect without causing the drip phenomenon.

We previously proposed a fire-retardant thermoplastic resin composition prepared by blending an aromatic polyester resin with a fire retardant and a graft copolymer of butadiene polymer-vinyl monomer optionally together with glass fibers and additives. It has now been found that without using the above graft copolymer which is expensive and is likely to affect the weatherability of the resin adversely, a thermoplastic aromatic polyester resin composition having superior fire retardancy can be provided by blending the aromatic polyester resin with a fire retardant and a specific alkaline earth metal carbonate optionally together with glass fibers and additives. Some comparative experimental results to be given below will demonstrate that the alkaline earth metal carbonate itself cannot render aromatic polyesters fire-retardant and free from dripping to any feasible extent. Surprisingly, however, we have found that when such an alkaline earth metal carbonate is incorporated in an aromatic polyester together with a fire retardant, an effect of rendering the polymer fire-retardant and free from dripping is increased over the case of incorporating only the fire retardant. It has also been found that by using such an inexpensive and readily available alkaline earth metal carbonate together with the fire retardant, the inherent mechanical properties and thermal properties of the aromatic polyester can be retained and its electrical properties, especially its arc resistance, are improved, and that there is no likelihood of its weatherability being reduced.

Accordingly, it is an object of this invention to provide an aromatic polyester resin composition having more improved fire retardancy and being free from dripping, and a method for imparting fire retardancy to aromatic polyester resins.

The above and other objects and advantages of this invention will become more apparent from the following description.

The invention can provide a method for imparting to an aromatic polyester resin a notably improved fire retardancy which meets the standards of Underwriters Laboratories Subject 94 (UL 94) by incorporating a fire retardant and an alkaline earth metal carbonate without sacrificing its inherent desirable properties.

The fire-retardant thermoplastic resin composition of this invention consists essentially of:

(A) 100 parts by weight of an aromatic polyester resin, (B) from 0.5 to 100 parts by weight, preferably from more than 10 to 100 parts by weight, more preferably from about 20 to 100 parts by weight, of an alkaline earth metal carbonate, (C) from 0.5 to 50 parts by weight, preferably from about 3 to about 25 parts by weight of a fire retardant, (D) from 0 to 120 parts by weight, preferably from 0 to 100 parts by weight, of glass fibers, and (E) from 0 to 10 parts by weight, preferably from 0 to 5 parts by weight, of at least one additive selected from the group consisting of modifiers, stabilizers, coloring agents, mold releasing agents, nucleating agents, lubricants, inorganic fillers other than glass fibers, and blowing agents.

The aromatic polyester (A) used in this invention is a polyester containing an aromatic ring in its chain unit which is a polymer or copolymer obtained by condensation reaction of an aromatic dicarboxylic acid or its ester-forming derivative and a diol or its ester-forming derivative as main reaction components. Examples of the aromatic dicarboxylic acid component are dicarboxylic acids containing a benzene nucleus such as terephthalic acid or isophthalic acid, dicarboxylic acids containing a naphthalene nucleus such as naphthalene-2,7-dicarboxylic acid or naphthalene-2,6-dicarboxylic acid, and ester-forming functional derivatives of these acids. Not more than 20 mole % of the acid component can be replaced by another dicarboxylic acid such as adipic acid or sebacic acid, or ester-forming derivatives thereof. Examples of the diol component are aliphatic glycols such as ethylene glycol, trimethylene glycol, tetramethylene glycol, hexamethylene glycol, diethylene glycol and cyclohexanediol, diols containing an aromatic nucleus such as 1,4-bishydroxyethoxybenzene or bisphenol A, and ester-forming derivatives of these diols.

The aromatic polyester (A) may be a mixture of two or more aromatic polyesters.

Examples of preferred aromatic polyesters as component (A) are polyethylene terephthalate, polytrimethylene terephthalate, polytetramethylene terephthalate, polyhexamethylene terephthalate, polyethylene-2,6-naphthalate and polytetramethylene-2,6-naphthalate.

The present invention is especially suitable for improving polyethylene terephthalate, polytrimethylene terephthalate, polytetramethylene terephthalate and mixtures thereof which have unsatisfactory fire retardancy.

Examples of the alkaline earth metal carbonate (B) used in this invention are calcium carbonate, strontium carbonate, barium carbonate, magnesium carbonate, and radium carbonate, the calcium carbonate being especially preferred.

The term "fire retardant", as used in this application, denotes not only a fire retarding agent itself, but also a combination of the fire retarding agent and an assistant therefor. Accordingly, in the case of the latter, the amount of the fire retardant (C) is the total amount of the fire retardant and the fire retarding assistant. Preferably, the fire retardant (C) used in this invention is an organic halogen compound or an organophosphorus compound or both. Examples of preferred fire retarding assistants to be used together with the fire retardant, especially organic halogen compound, are compounds of metals of Group Vb of the periodic table, such as their oxides (e.g., $Sb_2O_3$).

The organic halogen compound may, for example, be an aromatic, alicyclic or aliphatic compound containing a halogen selected from bromine, chlorine and fluorine.

Specific examples of the halogen-containing aromatic compounds are halogen-substituted benzene compounds such as 1,3-dichlorobenzene, 1,4-dibromobenzene, 1,3-dichloro-4-hydroxybenzene, 1,3-dichloro-4-hydroxybenzene, hexachlorobenzene, hexabromobenzene, tetrachlorophthalic anhydride, tetrabromophthalic anhydride, or tetrabromoterephthalic acid; biphenyl ether compounds such as 2,2'-dichlorobiphenyl, 2,4'-dibromobiphenyl, 2,4'-dichlorobiphenyl, 4,4'-dibromobiphenyl, 2,2',4,4'-tetrabromobiphenyl, decabromobiphenyl ether or hexabromobiphenyl ether; and halogenated aralkyl compounds such as 2,2-bis-(3,5-dichlorophenyl) propane, bis-(2-chlorophenyl) methane, bis-(2,6-dibromophenyl) methane, 1,1-bis-(4-iodophenyl) ethane, 1,2-bis-(2,6-dichlorophenyl) ethane, 1,1-bis-(2-chloro-4-iodophenyl) ethane, 1,1-bis-(2-chloro-4-methylphenyl) ethane, 1,1-bis-(3,5-dichlorophenyl) ethane, 1,1-bis-(3-phenyl-4-bromophenyl) ethane, 2,2-bis-(4,6-dichloronaphthyl) propane, 2,2-bis-(2,6-dichlorophenyl) pentane, 2,2-bis-(3,5-dibromophenyl) hexane, bis-(4-chlorophenyl) phenylmethane, bis-(3,5-dichlorophenyl) cyclohexylmethane, bis-(3-nitro-4-bromophenyl) methane, bis-(4-hydroxy-2,6-dichloro-3-methoxyphenyl) methane, 2,2-bis-(3,5-dichloro-4-hydroxyphenyl) propane, 2,2-bis-(3-bromo-4-hydroxyphenyl) propane, and 2,2-bis-(3,5-dibromo-4-hydroxyphenyl) propane.

Examples of the halogen-containing alicyclic compounds are halogen-substituted products of cyclopentadiene dimer, halogen-substituted products of compounds of the following formula

wherein Z is a tetravalent organic group, and halogen-substituted products of chlorendic anhydride. Specific examples are compounds of the formula

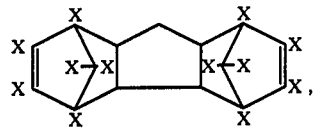

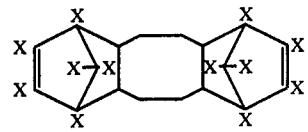

wherein X independently represents chlorine or bromine.

Examples of the halogen-containing aliphatic compounds are tetrakis-(bromomethyl)methane, and 2,2-bis(bromomethyl)-1,3-propanediol.

The halogen-containing aromatic compound is a preferred fire retardant for use in this invention. Especially preferably, the fire retardant is a member selected from the group consisting of decabromobiphenyl, decabromophenyl ether, hexabromobenzene, a compound of the following formula

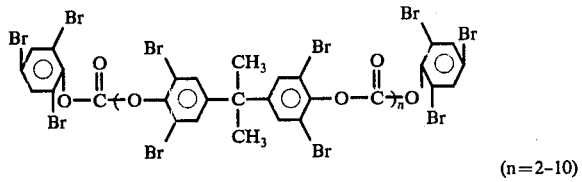

(n=2-10)

a nuclearly brominated product of a low polymer of 2,2-bis[4-(2,3-epoxypropoxy) phenyl] propane.

Examples of the organic phosphorus compounds suitable for use as fire retardants in this invention include phosphates, phosphites, phosphonates, phosphonites, phosphinates, phosphinites, phosphines, phosphine oxides, phosphine sulfides, phosphonitrile, phosphoramide, phosphonamide, phosphinamde, and phosphonium salts.

Specific examples of the phosphates are phenyl bisdodecyl phosphate, phenyl bis-neopentyl phosphate, phenylethylene hydrogen phosphate, phenyl-bis-(3,5,5'-trimethylhexyl phosphate), ethyl diphenyl phosphate, 2-ethylhexyl di-(p-tolyl) phosphate, diphenyl hydrogen phosphate, bis(2-ethylhexyl) p-tolyl phosphate, tritolyl phosphate, bis-(2-ethylhexyl) phenyl phosphate, tri(nonyl phenyl) phosphate, phenylmethyl hydrogen phosphate, di(dodecyl) p-tolyl phosphate, tricresyl phosphate, triphenyl phosphate, dibutyl phenyl phosphate, p-tolyl bis-(2,5,5'-trimethylhexyl) phosphate, 2-ethylhexyl diphenyl phosphate, and diphenyl hydrogen phosphate. Halogen-substituted products of the aromatic-containing phosphates illustrated above can also be used.

Examples of the phosphites are triphenyl phosphite and tricresyl phosphite.

Examples of the other organophosphorus compounds include diphenyl phenyl phosphonate, phenyl diphenyl phosphinate, triphenyl phosphine, triphenylphosphine oxide, triphenylphosphine sulfide, hexamethyl phosphoric triamide, tri(aziridinyl) phosphine oxide, tetrakis (hydroxymethyl) phosphonium chloride, hexachlorophosphazene, and hexaphenylphosphazene. Halogen-substituted products of the aromatic-containing phosphorus compounds illustrated above can also be used.

Elemental phosphorus can also be used. Of the above-illustrated phosphorus compounds, triphenyl phosphate is most preferred.

The compounds of metals of Group Vb of the periodic table suitable as a fire-retarding assistant are, for example, compounds of antimony and bismuth. Of these, antimony trioxide is especially preferred.

These compounds as the fire retardant or assistant can be used either alone or in combination of two or more. A greater fire-retarding effect can be obtained by using the organic halogen compound together with the Vb metal compound.

In addition to the alkaline earth metal carbonate and the fire retardant, the aromatic polyester composition of this invention can further contain glass fibers and other additives. Preferably, the glass fibers are sized with a bundling agent comprising a coupling agent, for example, an organosilane compound such as vinyl trichlorosilane, vinyl tris($\beta$-methoxyethoxy) silane, $\gamma$-glycidoxypropyl-trimethoxysilane, $\beta$-(3,4-epoxycyclohexyl)-ethyltrimethoxysilane, or $\gamma$-aminopropyltriethoxysilane, or an organic chromic acid compound such as methacrylate chromic chloride, and a film-forming agent such as an epoxy resin, a vinyl resin, or an unsaturated polyester resin.

It has been believed that the blending of glass fibers aggravates the drip phenomenon of thermoplastic aromatic polyesters, as described in U.S. Pat. No. 3,751,396. However, we have found that such a disadvantage can be obviated when they are incorporated in an aromatic polyester together with the alkaline earth metal carbonate (B) and the fire retardant (C) in the specified amounts.

The composition of this invention may be in various forms such as a powder, granule, flake or pellet or in other forms of molding material, or in various forms of melt-shaped articles such as extrusion-molded articles or injection-molded articles. The composition may further contain various additives such as modifiers, stabilizers, coloring agents (including fluorescent bleaching agents), mold releasing agents, nucleating agents, lubricants, inorganic fillers other than glass fibers, and blowing agents.

The addition of the modifiers is useful for improving the mechanical properties of the composition. Examples of the modifiers are epoxy compounds, isocyanate compounds, polycarboxylic acid anhydrides, and metal salts of aliphatic carboxylic acids. Preferred modifiers are the epoxy compounds such as bisphenol A-type epoxy compounds, phenol- epoxy compounds, aromatic carboxylic acid-type epoxy compounds, alicyclic epoxy compounds, or aliphatic epoxy compounds, and the isocyanate compounds, for example, diisocyanates such as diphenylmethane diisocyanate or toluene diisocyanate, and triisocyanates such as triphenylmethane triisocyanate. These compounds can be used either alone or in combination of two or more. Certain resins can also be used as the modifiers in small amounts which do not adversely affect the fire retardancy and other desirable properties of the composition of this invention. Examples of the resins are thermoplastic resins such as vinyl resin, a styrol resin, an acrylic resin, polyethylene, polypropylene, a fluorine resin, a polyamide resin, an acetal resin, polycarbonate, polysulfone or polyphenylene oxide, thermosetting resins such as a phenol resin, a melamine resin, a polyester resin, a silicone resin, or an epoxy resin), and soft thermoplastic resins other than a graft copolymer of butadiene polymer-vinyl monomer, such as an ethylene/vinyl acetate copolymer, a polyester elastomer, or an ethylene/propylene copolymer. These resins can be used either alone or in combination of two or more.

The stabilizer may, for example, be an oxidiation stabilizer, light stabilizer, or heat stabilizer. Specific examples of the stabilizers are benzotriazole compounds such as 2-hydroxy-5-methylbenzotriazole or 2-hydroxy-3-chloro-5-t-butylbenzotriazole, benzophenone compounds such as 2,4-dihydroxybenzophenone, phenyl salicylate-type compounds such as phenyl salicylate, cyanoacrylates, phenol compounds such as stearyl 3,5-di-t.-butyl-4-hydroxyphenyl propionate, amine compounds such as N,N'-di-$\beta$-naphthyl-para-phenylenediamine, and sulfur compounds such as dilauryl thiopropionate.

The coloring agent may be any desired dye or pigment or a fluorescent bleaching agent.

Examples of the mold releasing agent include silicones and higher fatty acid esters or salts. The nucleating agent may, for example, be an inorganic nucleating agent such as talc, graphite or metal oxides, or an organic nucleating agent such as benzophenone or a salt such as sodium terephthalate.

The fillers other than glass fibers include, for example, carbon fibers, asbestos, rock wool, or powders of carbon, clay or silica. The incorporation of the filler is preferred because it improves the mechanical characteristics, resistance to thermal deformation and fire retardancy of the composition of this invention.

Preferred combinations of the aromatic polyester (A), the alkaline earth metal carbonate (B) and the fire retardant (C) are as follows:

(1) The aromatic polyester (A) is an aromatic polyester having an intrinsic viscosity of 0.6 to 2.0 and selected from the group consisting of polyethylene terephthalate, polytrimethylene terephthalate, polytetramethylene terephthalate, polyhexamethylene terephthalate, polyethylene-2,6-naphthalate and polytetramethylene-2,6-naphthalate, in which at least 80% of the acid component consists of terephthalic acid or 2,6-naphthalenedicarboxylic acid, and at least 80% of the glycol component consists of an aliphatic glycol containing 2 to 6 carbon atoms.

(2) The alkaline earth metal carbonate (B) is calcium carbonate.

(3) The fire retardant (C) is either (i) an aromatic halogen compound and/or an alicyclic halogen compound not containing tertiary hydrogen, (ii) an aromatic halogen compound and/or an alicyclic halogen compound not containing tertiary hydrogen, and antimony oxide as the Vb metal compound, or (iii) red phosphorus or a metal salt, amide or ester of phosphoric acid or phosphorous acid.

The amount of the alkaline earth metal carbonate (B) used in this invention is from 0.5 to 100 parts by weight, preferably from more than 10 to 100 parts by weight, more preferably from about 20 to 100 parts by weight, per 100 parts by weight of the aromatic polyester resin (A). The amount of the carbonate, however, may vary according, for example, to the type or amount of the fire retardant or other additive, for example, glass fibers. In any case, if its amount is outside the range specified above, no satisfactory effect can be obtained of preventing the drip phenomenon in the presence of the fire retardant, or of reducing the amount of the fire retardant owing to the synergistic fire retarding effect it will produce.

The amount of the fire retardant (when a fire retarding assistant is used, the total amount of it and the fire retardant) is from 0.5 to 50 parts by weight. The preferred amount differs according to the type of the fire retardant. For example, in the absence of a fire-retarding assistant, the preferred amount is 0.5 to 20 parts by weight for elemental red phosphorus, 10 to 50 parts by weight for triphenyl phosphate, and 0.5 to 30 parts by weight of the halogenated aromatic compound, all based on 100 parts by weight of the aromatic polyester (A). When a fire-retarding assistant is used, the preferred amount is, for example, 0.5 to 20 parts by weight for the halogenated aromatic compound together with 1 to 20 parts by weight of the Vb metal compound. When the amount of the fire retardant (C) is less than the lower limit of the above-specified range, no satisfactory fire retardancy can be imparted even in the presence of the alkaline earth metal carbonate. On the other hand, when the amount exceeds the upper limit of the above-specified range, the resulting resin composition would have reduced mechanical or thermal properties although it may have entirely satisfactory fire retardancy.

In the preferred combinations of the aromatic polyester (A), the alkaline earth metal carbonate (B) and the fire retardant (C) described above, the preferred amounts of the alkaline earth metal carbonate and the fire retardant are as shown in (a), (b) and (c) below.

(a) When using the halogenated aromatic compound and/or the halogenated alicyclic compound without an assistant:

The amount of the fire retardant (C) is expressed by the following equations.

$$1.5 \leq F_1 \leq (-0.06 G + 40) \quad (1)$$

$$10 \leq G \leq 100$$

wherein $F_1$ is the weight of available halogen in the halogenated compound per 100 parts by weight of the aromatic polyester (A), and G is the parts by weight of the alkaline earth metal carbonate (B) per 100 parts by weight of the aromatic polyester (A).

(b) When using the halogenated aromatic compound and/or the halogenated alicyclic compound not containing tertiary hydrogen together with the Vb metal compound:

The amount is such that the ratio of available halogen in the halogenated compound to the available metal in the Vb metal compound is from 0.2 to 6, and at the same time is expressed by the following equations.

$$1.3 \leq F_2 \leq (-0.06 G + 35) \quad (2)$$

$$10 \leq G \leq 100$$

wherein G is the same as defined above, and $F_2$ is the parts by weight of a total of the available halogen in the halogenated compound and the available metal in the Vb metal compound per 100 parts by weight of the aromatic polyester (A).

(c) When using red phosphorus or a phosphorus as the fire retardant (C):

The amount of the fire retardant (C) is expressed by the following equations.

$$1.5 \leq F_3 \leq (0.07 G + 45) \quad (3)$$

$$10 \leq G \leq 100$$

wherein G is the same as defined above, and $F_3$ is the parts by weight of red phosphorus or available phosphorus in the phosphorus compound per 100 parts by weight of the aromatic polyester (A).

The composition of this invention may contain glass fibers (D) in an amount of not more than 120 parts by weight, preferably not more than about 100 parts by weight, more preferably not more than about 80 parts by weight, per 100 parts by weight of the aromatic polyester (A).

The additives described above can be incorporated in the resin composition of this invention in an amount of up to 10 parts by weight per 100 parts by weight of the aromatic polyester resin (A). The amount varies according to the type of the additives. For example, the amount is not more than 10 parts by weight, preferably not more than 5 parts by weight, for the modifiers; not more than 10 parts by weight, preferably not more than 5 parts by weight for the stabilizers; 0.05 to 10 parts by weight, preferably up to 5 parts by weight, for the mold releasing agent; 0.01 to 10 parts by weight, preferably up to 5 parts by weight, for the nucleating agents; 0.01 to 10 parts by weight, preferably up to 5 parts by weight of the lubricants; 1 to 10 parts by weight for the fillers; and 0.01 to 10 parts by weight, preferably up to 5 parts for the coloring agents.

The degree of the self-extinguishing property of the fire-retardant thermoplastic resin composition of this invention, as determined by the method set forth in the revised edition of UL-94 issued on June 10, 1974, is such that a thin test piece of the composition having a thickness of 1/16 inch or more is non-dripping and has a degree of fire retardancy of 94V-0, and preferably a thin test piece of the composition having a thickness of 1/32 inch is non-dripping and has a degree of fire-retardancy of 94V-0.

The composition of this invention can be prepared by various methods.

For example, in the case of preparing a composition of this invention containing glass fibers (D), a glass roving is cut into small pieces, for example, to a length of, say, 0.3 to 1.2 cm, and is placed in an extruder-mixer together with the aromatic polyester (A), the fire retardant (C) and the alkaline earth metal carbonate (B) with or without an additive (E) to form molding pellets. The fibers are reduced in length and redispersed during this treatment, and finally have a length of 0.02 cm or less. Another method comprises pulverizing the glass fibers to reduce them in length, dry-blending them with the aromatic polyester resin (A), the fire retardant (C) and the alkaline earth metal carbonate (B) with or without an additive (E), and pulverizing and kneading the mixture or extruding the mixture to attenuate it. Still another method comprises drawing a continuous glass roving into a bath containing molten polyester resin (A) and fire retardant (C) to coat the glass filaments, and cutting the resin-coated glass strand into small tubes, for example, to a length of 0.5 cm or more. It is also possible to directly mold a mixture of the above-mentioned coated glass fibers with the polyester resin (A) and an additive by an injection-molding or transfer molding method. Preferably, the aromatic polyester (A), the glass fibers (D), the alkaline earth metal carbonate (B), and the fire retardant (C) should be dehydrated as much as possible prior to molding. Compositions free from glass fibers can be prepared usually by the same methods as described above except that procedures relating to the glass fibers are omitted.

It is preferred to ensure intimate mixing of the resin with the additive by shortening the retention time in the machine, controlling the temperatures carefully, and utilizing the heat of friction.

The composition can be molded under any conventional conditions using any conventional apparatus. For example, when poly(1,4-butylene terephthlate) is used as the aromatic polyester resin (A), good results can be obtained by injection-molding the composition at an ordinary cyclinder temperature (for example, 250° C.) and an ordinary mold temperature (for example, 60° C.). In the case of polybutylene-2,6-naphthalate, good results can be obtained at a cylinder temperature of 250° C and a mold temperature of 60° C. When polyethylene terephthalate is used, a somewhat modified method must be used because the crystallization of the polymer extending from its inside to outside is not uniform. For example, a crystallization promotor (such as graphite, a metal oxide, e.g. ZnO or MgO, or a sodium salt oxidized montan wax) is added, and a standard mold temperature of 60° to 80° C. is used. Or without using such a nucleating agent, a mold temperature of at least 140° C. is used. This method is also applicable to the case of using polyethylene-2,6-naphthalate. Or by blending the polyethylene terephthalate with the polybutylene terephthalate or polybutylene-2,6-naphthalate mentioned above, a mold temperature of 60° to 80° C. can be employed.

The following Examples and Comparative Examples illustrate the present invention in greater detail. All parts and percentages in these examples are by weight.

The various properties of the composition obtained were measured by the following methods.

Tensile strength: ASTM D-638
Bending strength: ASTM D-790
Bending modulus: ASTM D-790
Heat distortion temperature: ASTM D-648
Weatherability: ASTM D-1435
Arc resistance: ASTM D-495
Fire retardancy: Underwriters Laboratories Subject 94 (the revised edition used on June 10, 1974)

EXAMPLES 1 TO 5 AND COMPARATIVE EXAMPLES 1 TO 5

Dimethyl terephthalate and 1,4-butanediol were polymerized by a customary method to form polytetramethylene terephthalate having an intrinsic viscosity of 1.2.

The resulting polyester, decabromobiphenyl oxide (FR-300BA, trademark for a product of Dow Chemical), antimony trioxide (a product of Nippon Seiko), glass fibers (CS6E-231, a trademark for a product of Nitto Boseki) and calcium carbonate (TANCAL S, trademark for a product of Hayashi Kasei, the particles passed through a 325-mesh screen) were fed simultaneously into an extruder in the amounts indicated in Table 1-1, and mixed and granulated.

The composition was molded by an injection-molding machine to form molded articles having a length of 5 inches, a width of ½ inch and a thickness of 1/16 or 1/32 inch. The degree of fire retardancy of the molded article was determined by the method specified in Underwriters Laboratories Subject 94 (UL 94). The method was as follows:

The test piece was maintained perpendicular, and a ¾ inch flame of a burner was applied for 10 seconds to the test piece in a manner such that the lower part of the test piece went into half the length of the flame. Then, the burner was removed, and when the fire went out, the flame was again applied to the test piece for 10 seconds. The presence or absence of drip, and the ignition by the drip of an absorbent wadding located 12 inches immediately below the test piece were examined. Also, the time that elapsed from the removal of the burner until the fire self-extinguished (to be referred to as "afterburning time") was measured. The results of this test were evaluated for the degree of fire retardancy of the test piece on the following scale. In each item of the test, five test pieces were used, and the results shown were an average of those of the five test pieces.

94V-0: The after-burning time was not more than 10 seconds, and the wadding was not ignited by drip.

94V-1: The after-burning time was more than 10 seconds but up to 30 seconds, and the wadding was not ignited by drip.

94V-2: The after-burning time was more than 10 seconds but up to 30 seconds but the wadding was ignited by drip.

94HB: ⅛ inch thick test piece (the burning rate is 1.5 inches/min.); 1/16 inch and 1/32 inch thick test pieces (the burning rate is 2.5 inches/min.)

The results are shown in Table 2. In Table 2, under the heading "Drip", the "none" refers to the case where no drip occurs, and the evaluation can therefore be assigned to 94V-0 or 94V-1. The "yes (ignited)" means that drip occurs and causes the ignition of the wadding, and the evaluation cannot be assigned to 94V-0 or 94V-1. The "yes (not ignited)", on the other hand, means that drip occurs but does not causes the ignition of the wadding, and the evaluation can be assigned either to 94V-0 or 94V-1.

It can be seen that in Examples 1 to 5, the use of the alkaline earth metal carbonate brought about an effect of preventing the drip phenomenon. In Comparative Example 2, the amount of the fire retardant could be reduced markedly. When only calcium carbonate was added without a fire retardant (Comparative Example 1), no effect was obtained of either preventing the drip phenomenon or imparting fire retardancy. In Comparative Examples 4 and 5 in which conventional reinforcing agents were added instead of the alkaline earth metal carbonate, neither a fire retarding effect nor a drip preventing effect can be observed.

The various properties of the molded articles obtained in Example 1 and Comparative Example 2 were measured, and the results are shown in Table 3 below.

Table 3

| Test Items | Example 1 | Comparative Example 2 |
| --- | --- | --- |
| Tensile strength | 1,450 | 1,350 |
| Bending strength | 1,980 | 1,850 |
| Tending modulus | 102,000 | 98,000 |
| Impact strength (Izod notched) | 11.0 | 10.5 |
| Heat distortion temperature | 210 | 210 |
| Arc resistance (sec.) | 180 | 120 |
| Weatherability* (%) | 100 | 90 |

Note:
*The retention of impact strength after outdoor exposure for 6 months.

EXAMPLE 6

The procedure of Example 1 was repeated except that polyethylene terephthalate was used instead of the polytetramethylene terephthalate. The results are shown in Tables 1 and 2.

EXAMPLES 7 TO 9

The procedure of Example 1 was repeated except that the use of antimony trioxide was omitted and red phosphorus, a disodium salt of ethyl-1,2-bis-(methylphosphinic acid), and a carbonate oligomer of tetrabromobisphenol A (TBA-PC) were used respectively as a fire retardant. The results are shown in Tables 1 and 2.

Table 1

| Examples (Ex.) or Comparative Examples (Com.) | Polyesters | | | Glass fibers (parts) | Fire retardant | | Antimony oxide (parts) | Alkaline earth metal carbonate or filler | |
| --- | --- | --- | --- | --- | --- | --- | --- | --- | --- |
| | Kind | Intrinsic viscosity | Amount (parts) | | Kind | Amount (parts) | | Kind | Amount (parts) |
| Ex. 1 | C$_4$T | 1.20 | 100 | 35 | DBBO | 13.3 | 8.0 | CaCO$_3$ | 20 |
| Ex. 2 | " | " | " | 39 | " | 11.0 | 6.7 | " | 39 |
| Ex. 3 | " | " | " | 47 | " | " | 6.6 | " | 71 |
| Ex. 4 | " | " | " | 45 | " | 7.6 | 4.7 | " | 67 |
| Ex. 5 | " | " | " | 0 | " | 8.8 | 5.1 | " | 100 |
| Com. 1 | " | " | " | 47 | — | 0 | 0 | " | 71 |
| Com. 2 | " | " | " | " | DBBO | 11.0 | 6.6 | — | 0 |
| Com. 3 | " | " | " | " | " | " | " | CaCO$_3$ | 0.3 |
| Ex. 6 | C$_2$T | 0.75 | " | 67 | " | 6.7 | 4.4 | " | 44 |
| Ex. 7 | C$_4$T | 1.20 | " | 40 | red phosphorus | 10 | 0 | " | 50 |
| Ex. 8 | " | " | " | 42.6 | DSEMP | 17 | 0 | " | 53 |
| Ex. 9 | " | " | " | 50 | TBA-PC | 45 | 0 | " | 50 |
| Com. 4 | " | " | " | 47 | DBBO | 11 | 6.6 | calcium silicate | 71 |
| Com. 5 | " | " | " | " | " | " | " | talc | " |

Abbreviations
C$_2$T: polyethylene terephthalate; C$_4$T: polytetramethylene terephthalate; DBBO: decabromobiphenyl ether; TBA-PC: oligomeric polycarbonate of tetrabromobisphenol A (having an average degree of polymerization of about 4.5); DSEMP: a disodium salt of ethyl-1,2-bis-(methylphosphinic acid).

Table 2

| Examples (Ex) or Comparative Examples (Com.) | UL test (1/16 inch) | | | | UL test (1/32 inch) | | | |
| --- | --- | --- | --- | --- | --- | --- | --- | --- |
| | After burning time (seconds) | | | | After-burning time (seconds) | | | |
| | After first removal | After second removal | Drip | Evaluation | After first removal | After second removal | Drip | Evaluation |
| Ex. 1 | 0.5 | 0.5 | None | 94V-0 | 0.5 | 1 | None | 94V-0 |
| Ex. 2 | 0.5 | 0.5 | None | 94V-0 | 1 | 2 | None | 94V-0 |
| Ex. 3 | 0.5 | 0.5 | None | 94V-0 | 1 | 2 | None | 94V-0 |
| Ex. 4 | 1 | 2 | None | 94V-0 | 3 | — | Yes (not ignited) | 94V-0 |
| Ex. 5 | 0.5 | 0,5 | None | 94V-0 | 2 | — | Yes (not ignited) | 94V-0 |
| Com. 1 | more than 30 | — | Yes (ignited) | 94HB | | | | |
| Com. 2 | 1 | — | Yes (ignited) | 94V-2 | | | | |
| Com. 3 | 0.5 | — | Yes (ignited) | 94V-2 | | | | |
| Ex. 6 | 1 | 2 | None | 94V-0 | 2 | — | Yes (not ignited) | 94V-0 |
| Ex. 7 | 0.5 | 0.5 | None | 94V-0 | 1 | 1 | None | 94V-0 |
| Ex. 8 | 0.5 | 0.5 | None | 94V-0 | 0.5 | 1 | None | 94V-0 |
| Ex. 9 | 1 | 1 | None | 94V-0 | 1 | 2 | None | 94V-0 |
| Com. 4 | 1 | — | Yes (ignited) | 94HB | 2 | — | Yes (ignited) | 94V-2 |
| Com. 5 | 1 | — | Yes (not ignited) | 94V-0 | 1 | — | Yes (ignited) | 94V-2 |

What we claim is:

1. A fire-retardant thermoplastic polyester resin composition which consists essentially of:
    (A) 100 parts by weight of an aromatic polyester selected from the group consisting of polyethylene terephthalate, polytrimethylene, terephthalate, polytetramethylene terephthalate, polyhexamethylene terephthalate, polyethylene-2,6-naphthalate, polytetramethylene-2,6-naphthalate and mixtures thereof,
    (B) from 20 to 100 parts by weight of an alkaline earth metal carbonate,
    (C) from 0.5 to 30 parts by weight of a fire-retardant, selected from the group consisting of (1) a compound selected from the group consisting of halogen-substituted benzene compounds, halogen-substituted hydroxybenzene compounds, halogen-substituted biphenyl ether compounds, a compound of the following formula:

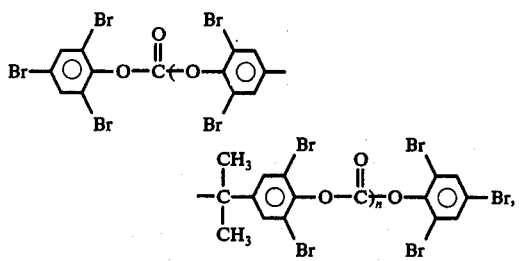

or a nuclearly brominated product of a low polymer of 2,2-bis[4-(2,3-epoxypropoxy) phenyl] propane, and bis-halogenated aralkyl compounds wherein the alkyl has from 1 to 6 carbon atoms and each of two hydrogen atoms, on the same or different carbon atom, is substituted by a halophenyl or halonaphthyl group and wherein, when the alkyl is methyl, one hydrogen atom may be substituted by a phenyl or cyclohexyl group and the halophenyl and halonaphthyl groups may include an inert substituent selected from the group consisting of nitro, hydroxyl and methoxy, (2) a combination of a compound of a metal of Group V$b$ of the periodic table with a compound selected from (1), or (3) red phosphorous, and (d) glass fibers present in not more than 120 parts by weight.

2. The composition of claim 1 which is in the form of an injection-molded article.

3. A method for imparting fire retardancy to an aromatic thermoplastic polyester resin, which comprises blending 100 parts by weight of the polyester with 0.5 to 100 parts by weight of an alkaline earth metal carbonate, 0.5 to 50 parts by weight of a fire retardant, selected from the group consisting of (1) a compound selected from the group consisting of halogen-substituted benzene compounds, halogen-substituted hydroxybenzene compounds, halogen-substituted biphenyl ether compounds, a compound of the following formula:

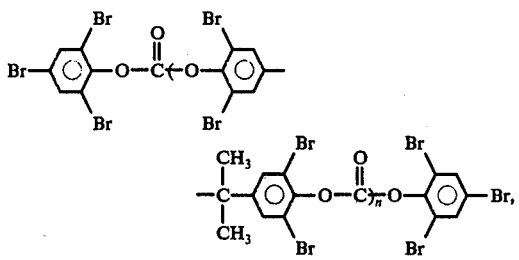

or a nuclearly brominated product of a low polymer of 2,2-bis[4-(2,3-epoxypropoxy) phenyl] propane, and bis-halogenated aralkyl compounds wherein the alkyl has from 1 to 6 carbon atoms and each of two hydrogen atoms, on the same or different carbon atom, is substituted by a halophenyl or halonaphthyl group and wherein, when the alkyl is methyl, one hydrogen atom may be substituted by a phenyl or cyclohexyl group and the halophenyl and halonaphthyl groups may include an inert substituent selected from the group consisting of nitro, hydroxyl and methoxy, (2) a combination of a compound of metal of Group V$b$ of the periodic table with a compound selected from (1), or (3) red phosphorus, and 120 parts by weight of glass fibers.

4. The composition of claim 1 wherein the fire-retardant is present in from about 3 to about 25 parts by weight.

5. The composition of claim 1 wherein the aromatic polyester is polyethylene terephthalate, polytrimethylene terephthalate, polytetramethylene terephthalate, or mixtures thereof.

6. The composition of claim 1 wherein the alkaline earth metal carbonate is calcium, strontium, barium, or radium carbonate.

7. The composition of claim 1 wherein the alkaline earth metal carbonate is calcium carbonate.

8. The composition of claim 1 wherein the glass fibers are present in up to 100 parts by weight.

9. The composition of claim 1 wherein the glass fibers are present in up to 80 parts by weight.

10. The composition of claim 1 wherein the glass fibers are present in from 35 to 67 parts by weight.

11. The composition of claim 1 wherein the fire retardant is a brominated aromatic compound present in from 0.5 to 30 parts by weight.

12. The composition of claim 1 wherein the fire retardant is selected from the group consisting of decabromobiphenyl, decabromobiphenyl ether, hexabromobenzene, a compound of the following formula

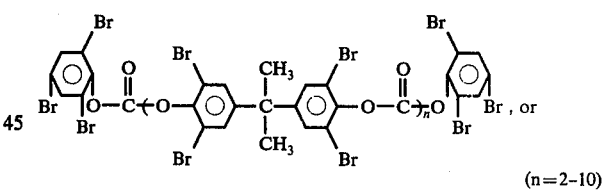

(n=2-10)

a nuclearly brominated product of a low polymer of 2,2-bis[4-(2,3-epoxypropoxy) phenyl] propane.

13. The composition of claim 1 wherein the compound of Groub V$b$ is a compound of bismuth or of antimony and the fire retardant is (2).

14. The composition of claim 13 wherein the compound of Group V$b$ is antimony trioxide.

* * * * *